(12) United States Patent
Hodgkinson

(10) Patent No.: US 10,190,716 B1
(45) Date of Patent: Jan. 29, 2019

(54) HEATED HOSE WITH IMPROVED POWER FEEDTHROUGH

(71) Applicant: Akurate Dynamics, LLC, Houston, TX (US)

(72) Inventor: Andrew Hodgkinson, Houston, TX (US)

(73) Assignee: AKURATE DYNAMICS, LLC, Houston, TX (US)

( * ) Notice: Subject to any disclaimer, the term of this patent is extended or adjusted under 35 U.S.C. 154(b) by 0 days.

(21) Appl. No.: 16/127,308

(22) Filed: Sep. 11, 2018

(51) Int. Cl.
| | |
|---|---|
| *H05B 3/78* | (2006.01) |
| *F16L 53/38* | (2018.01) |
| *F16L 11/127* | (2006.01) |
| *B05B 7/16* | (2006.01) |
| *B05C 11/10* | (2006.01) |
| *B05B 7/22* | (2006.01) |
| *B05C 9/14* | (2006.01) |
| *B05B 9/00* | (2006.01) |

(52) U.S. Cl.
CPC ............ *F16L 53/38* (2018.01); *B05B 7/1693* (2013.01); *B05B 7/22* (2013.01); *B05C 11/1042* (2013.01); *F16L 11/127* (2013.01); *B05B 9/002* (2013.01); *B05C 9/14* (2013.01)

(58) Field of Classification Search
USPC ...................................................... 392/485
See application file for complete search history.

(56) References Cited

U.S. PATENT DOCUMENTS

| | | | | |
|---|---|---|---|---|
| 972,131 | A | * 10/1910 | Shoenberg et al. ... | F24H 3/0405 123/142.5 E |
| 1,344,303 | A | * 6/1920 | Little ...................... | F02M 1/00 219/206 |
| 1,474,528 | A | * 11/1923 | Hurst ...................... | F02N 19/10 123/142.5 E |
| 2,809,269 | A | 10/1957 | Heron | |
| 2,883,513 | A | 4/1959 | Schnabel | |
| 3,754,118 | A | * 8/1973 | Booker ..................... | H05B 3/82 138/89 |
| 4,423,311 | A | * 12/1983 | Varney, Sr. ............... | E03B 7/14 392/468 |
| 4,501,952 | A | 2/1985 | Lehrke | |
| 5,859,953 | A | * 1/1999 | Nickless ................. | F16L 53/38 392/489 |
| 6,621,985 | B1 | * 9/2003 | Thweatt, Jr. ............. | F24H 1/225 392/465 |

(Continued)

*Primary Examiner* — Thor Campbell
(74) *Attorney, Agent, or Firm* — Blank Rome LLP

(57) ABSTRACT

A heated hose has pressure housings at or near its inlet and outlet. Heat is provided by an electric resistance heater located within the flow channel of the hose. Power feedthroughs in the pressure housings provide fluid-tight electrical power and return connections to the heater. The power feedthroughs may comprise a generally cylindrical body having a central axial bore. A conductor pin is situated within the central axial bore in spaced apart relation thereto creating an annulus. The annulus may be filled with an insulating material such as a ceramic. The power feedthroughs are retained within bores in each of the pressure housings. The bores have a circumferential groove in their inner walls which hold a seal such as an O-ring in sealing engagement with the outer surface of the generally cylindrical body of the power feedthrough.

20 Claims, 2 Drawing Sheets

(56) References Cited

U.S. PATENT DOCUMENTS

| | | | | |
|---|---|---|---|---|
| 7,034,258 | B2* | 4/2006 | Sutorius | B29C 45/2737 219/535 |
| 7,732,735 | B2* | 6/2010 | Bourget | B05B 7/1693 219/221 |
| 7,773,867 | B2* | 8/2010 | Bourget | B05C 11/1042 219/221 |
| 7,991,273 | B2* | 8/2011 | Sonderegger | F16L 53/38 392/478 |
| 8,028,721 | B2* | 10/2011 | Koskey, Jr. | F16L 53/38 138/33 |
| 8,180,207 | B2* | 5/2012 | Shirai | E03D 9/08 392/465 |
| 8,380,056 | B2* | 2/2013 | Evans | F24H 1/142 392/465 |
| 9,156,046 | B2 | 10/2015 | Jerdee et al. | |
| 9,410,652 | B2* | 8/2016 | Ellis | H05B 3/145 |
| 9,464,747 | B2* | 10/2016 | Eckardt | F16L 53/38 |
| 9,506,595 | B2* | 11/2016 | Eckardt | F16L 53/38 |
| 9,671,053 | B2* | 6/2017 | Eckardt | F16L 53/38 |
| 2006/0252292 | A1* | 11/2006 | Sonderegger | F16L 53/38 439/191 |
| 2009/0034949 | A1* | 2/2009 | Sawada | F24H 1/102 392/488 |
| 2010/0193530 | A1* | 8/2010 | Leonard | F01N 3/2066 220/694 |
| 2011/0299839 | A1* | 12/2011 | Harbour | A01K 7/027 392/472 |
| 2017/0122475 | A1 | 5/2017 | Jerdee et al. | |
| 2018/0117690 | A1 | 5/2018 | Hodgkinson | |

* cited by examiner

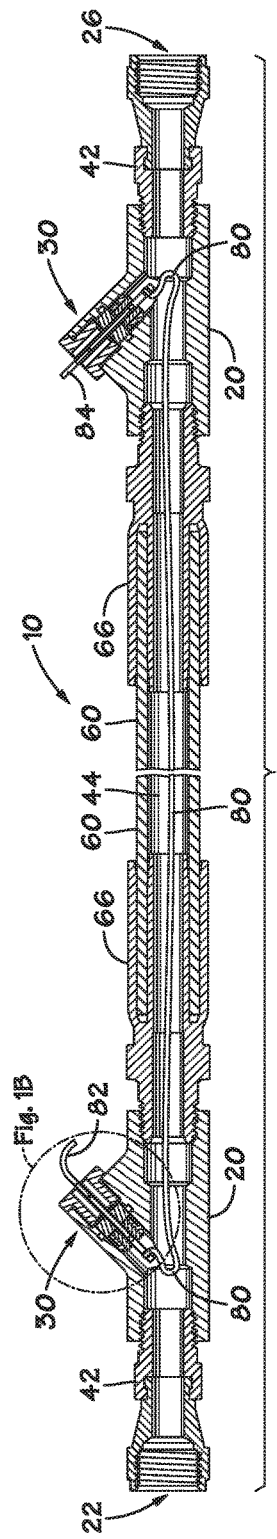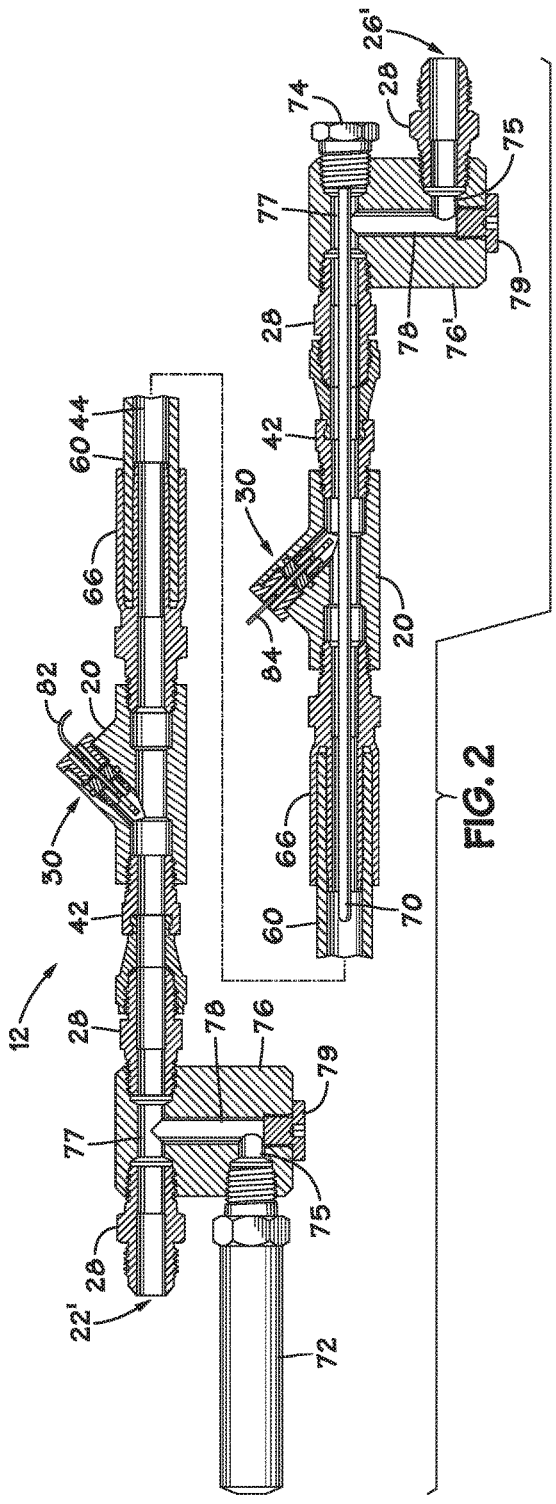

HEATED HOSE WITH IMPROVED POWER FEEDTHROUGH

BACKGROUND OF THE INVENTION

1. Field of the Invention

The present invention generally relates to fluid transport systems. More particularly, it relates to heated, flexible hoses for the delivery of chemical reactants to an application device such as a spray nozzle.

2. Description of the Related Art Including Information Disclosed Under 37 CFR 1.97 and 1.98

U.S. Pat. No. 2,809,268 to Heron describes flexible, electrically heated hoses of the kind comprising an electric heating conductor incorporated in the body of the hose and used for heating fluids, e.g. liquids, passing through the hose.

U.S. Pat. No. 2,883,513 to Schnabel describes a hose assembly with an internal electrical heating element comprising a flexible hose of metal-reinforced nonmetallic material, an electrical heating element disposed within the hose and extending throughout its length, an end fitting for the hose having a nipple and a socket concentrically disposed within and without the end of the hose, respectively, at an end thereof, and an insulated flexible metal lead-in connected at one end to the heating element and passing outwardly between the nipple and the inner surface of the hose and back over the outer surface of the hose between the hose and the socket such that an external electrical connection can be made to the other end of the lead-in, the nipple and the socket compressing the end of the hose and the lead-in therebetween so as to effect a fluid-tight seal between the end fitting and the hose.

U.S. Pat. No. 4,501,952 to Lehrke describes a fluid heater, particularly for heating paints, lacquers, varnishes and other spray coating material that includes an elongated hollow tube adapted to be inserted into a fluid flow line for fluid flow through the tube. An electric resistance heater is disposed within the tube and is surrounded by a helical coil member to create a helical fluid flow path through the tube. A temperature control system for regulating the operation of the heater includes a temperature sensing probe comprising a temperature responsive resistance element enclosed in a conical housing extending into the helical fluid flow path and having its apex contacting the heater and its conical surface area increasing in a direction away from the heater and extending across the cross section of the fluid flow path. The temperature control system is responsive to both the temperature and the rate of change of temperature of the probe and includes an ambient temperature compensation circuit for monitoring the ambient temperature and compensating temperature control circuits for regulating heater temperature as a function of ambient temperature as well as a function of static and dynamic fluid flow conditions in the helical flow path sensed by the probe.

U.S. Pat. No. 9,156,046 to Jerdee et al. describes a liquid in a conduit heater assembly that includes a plurality of heater modules each having a plurality of bores forming at least a first component path and a second component path, and at least one heating element receptacle configured to receive a heating element for heating the first and second component paths.

U.S. Publication No. 2017/0122475 by Jerdee et al. describes a modular fluid delivery assembly that comprises a fluid conduit. The modular fluid delivery assembly also comprises an electrical heating element disposed within the fluid conduit. The electrical heating element is configured to provide a heat source within the fluid conduit. The modular fluid delivery assembly also comprises a connection assembly, located proximate an end of the modular fluid delivery assembly, coupled to the heating element and the fluid conduit. The connection assembly is configured to provide a hydraulic coupling to the fluid conduit, and to provide an electronic coupling to the electrical heating element.

U.S. Publication No. 2018/0117609 by Hodgkinson discloses a multi-segment, heated hose that has temperature sensors at or near the outlet of each hose segment. Each hose segment also has separate means for heating a fluid in the hose segment. A heater power controller receives temperature data from each temperature sensor and independently adjusts the power to the heater in each hose segment to obtain and maintain a preselected fluid temperature at the outlet of each hose segment. The contents of U.S. Publication No. 2018/0117609 is hereby incorporated by reference in its entirety.

BRIEF SUMMARY OF THE INVENTION

A heated hose has a pressure housing at or near both its inlet and its outlet. The heater is an electric resistance heater located within the flow channel of the hose. A power feedthrough in one pressure housing provides a fluid-tight electrical power connection to the electric resistance heater in the flow channel. A power feedthrough in the other pressure housing provides a fluid-tight power return connection to the electric resistance heater in the flow channel.

The power feedthrough comprises a generally cylindrical body having a central axial bore. A conductor pin is situated within the central axial bore in spaced apart relation thereto creating an annulus. The annulus is filled with an insulating material such as a ceramic.

The power feedthroughs are retained within bores in each of the pressure housings. The bores have a circumferential groove in their inner walls which hold a seal such as an O-ring seal in sealing engagement with the outer surface of the generally cylindrical body of the power feedthrough.

BRIEF DESCRIPTION OF THE SEVERAL VIEWS OF THE DRAWING(S)

FIG. 1A is a cross-sectional view of a first exemplary embodiment of the invention.

FIG. 2 is a cross-sectional view of a second exemplary embodiment of the invention that includes pressure and temperature sensors.

DETAILED DESCRIPTION OF THE INVENTION

Figure 1C:
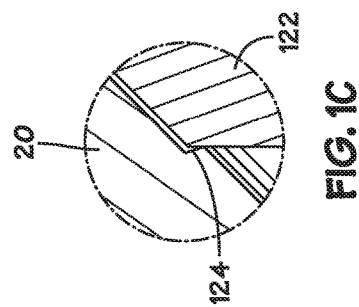
FIG. 1C is an enlarged view of the portion indicated in FIG. 1B.
Figure 1B:
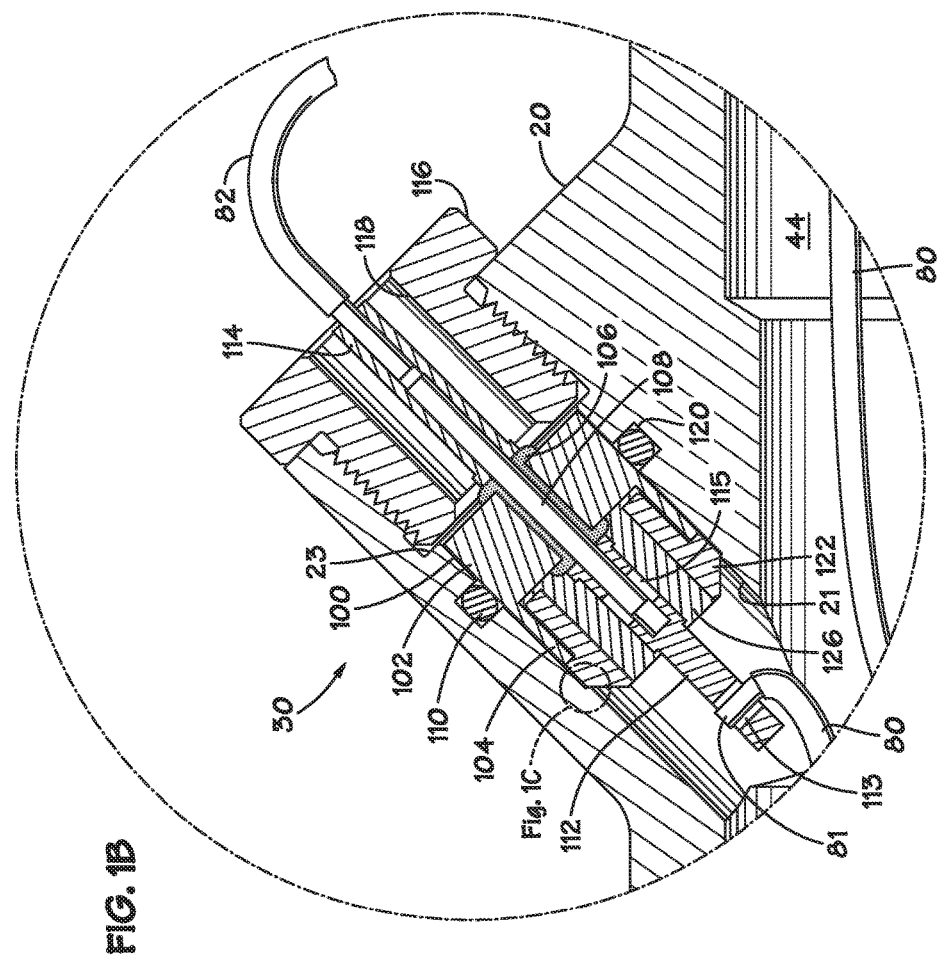
FIG. 1B is an enlarged view of the portion indicated in FIG. 1A.

The invention may best be understood by reference to the exemplary embodiments illustrated in the drawing figures wherein the following reference numbers are used:
  10 heated hose apparatus
  12 heated hose with temperature and pressure sensors
  20 pressure housing 21 central axial bore
22 hose inlet
23 shoulder
26 hose outlet
28 hose connection nipple
30 pressure-sealed connection
42 swivel hose connector
44 internal fluid conduit
60 flexible hose
66 hydraulic hose crimp connector
70 temperature sensor
72 pressure sensor
74 temperature sensor connector
75 third passageway
76 sensor adapter block
77 first passageway
78 second passageway
79 cap
80 heating element
81 uninsulated portion
82 heater power input
84 heater power return
100 power feedthrough
102 (metal) body
104 shell portion
106 insulator
108 conductor
110 O-ring seal
112 heating element connector
113 through hole
114 power connector
115 bleed hole
116 threaded retainer cap
118 bore
120 groove
122 stop insert
124 shoulder
126 filler Referring to FIGS. 1A-1C, heated hose apparatus 10 may have use in a wide variety of applications. One exemplary application is in a spray foam application system. Spray foam is a chemical product created by two materials, isocyanate and a polyol resin, which react when mixed with each other and expand up to 60 times their liquid volume after the mixture is sprayed in place. This expansion makes it useful as a specialty packing material which conforms to the shape of the product being packaged and produces a high thermal insulating value with virtually no air infiltration. Spray foam insulation or spray polyurethane foam (SPF) is an alternative to traditional building insulation such as fiberglass. A two-component mixture composed of isocyanate and a polyol resin comes together at the tip of a gun and forms an expanding foam that may be sprayed onto roof tiles, concrete slabs, into wall cavities, or through holes drilled into a cavity of a finished wall.

In such a multi-component sprayer system, the two (or more) liquid chemical reactants must be pumped to the spray gun. Each liquid reactant in the conduits leading to the gun may have different physical and chemical properties, such as viscosity and temperature-dependent chemical reactivity. In order to properly coat an article or foam a cavity, the correct amounts and correct temperature of each liquid reactant are needed at the gun so as to spray the mixture properly. Apparatus 10 of the present invention may be used to heat a liquid in a conduit to obtain or maintain a suitable viscosity and/or reactivity to be pumped and correctly proportioned with another liquid in another conduit, when mixed.

Apparatus 10 comprises a flexible hose 60 in fluid communication with pressure housing 20 at a first end thereof and pressure housing 20' at an opposing second end with heating element 80 (see FIG. 1A) disposed within internal fluid conduit 44. Electrical power leads 82 and 84 for heating element 80 enter and exit apparatus 10 via pressure-sealed connections 30 within pressure housings 20.

FIGS. 1A and 2 show embodiments having hydraulic hose crimps 66 at each end of flexible hose 60. Crimps 66 provide a pressure-resistant seal for the connection of hose 60 to respective pressure housings 20.

FIG. 1A shows how a heating element 80 may be positioned directly in internal fluid conduit 44 of flexible hose 60.

Heating element 80 may be a coated resistance wire or comprise other electrically powered heating means. In an embodiment, heating element 80 comprises an INCONEL® nickel-chromium alloy [HUNTINGTON ALLOYS CORPORATION, 3200 RIVERSIDE DRIVE, HUNTINGTON, WEST VIRGINIA 25705] having a TEFLON® polytetrafluoroethylene coating [E. I. DU PONT DE NEMOURS AND COMPANY, 1007 MARKET STREET, WILMINGTON, DELAWARE 19898]. The heat generated by resistance heating of the wire transfers to the liquid flowing in internal fluid conduit 44 containing heating element 80. The liquid in the conduit may be heated directly in the flow channel of the conduit, and need not rely upon contact with the walls of the conduit as with hoses having heating means in a jacket surrounding the hose.

Inlet 22 of hose 60 may have swivel hose connector 42 for connection to an adjacent hose segment and/or the source of pressurized fluid. Swivel hose connector 42 is attached to pressure housing 20 at a first end thereof. Hose 60 is connected to an opposing second end of pressure housing 20 which is in fluid communication with the first end via internal fluid conduit 44'. Pressure housing 20 is equipped with pressure-sealed connection 30 for the power leads 82 and 84 of heating element 80 within the flow path of hose 60. The exit of flexible hose 60 is connected to the inlet of pressure housing 20' at a first end thereof which is in fluid communication with an outlet at an opposing second end via an internal fluid conduit. Hose outlet 26 may comprise swivel hose connector 42 connected to the outlet end of pressure housing 20' for connection to an adjacent hose segment and/or the destination of the pressurized fluid—e.g. a spray applicator.

FIG. 2 illustrates an embodiment 12 wherein heated hose 10 is part of an assembly that includes pressure sensor 72 at an inlet end thereof and temperature sensor 70 at an outlet end thereof.

Inlet 22' of hose assembly 12 may comprise sensor adapter block 76 having first passageway 77 in threaded connection to a first hose connection nipple 28 at a first end thereof and a second hose connection nipple 28 at an opposing second end thereof. First passageway 77 is intersected by second passageway 78 which is intersected by third passageway 75 which is in fluid communication with pressure sensor 72 which is responsive to fluid pressure within passageways 75, 77, 78 and 44. Cap 79 seals the open end of passageway 78.

Outlet 26' of hose assembly 12 may comprise sensor adapter block 76' having first passageway 77 in threaded connection to hose connection nipple 28 at a first end thereof. First passageway 77 is intersected by second passageway 78 which is intersected by third passageway 75 which is in threaded connection to a second hose connection nipple 28 at an end thereof open to an external surface of sensor adapter block 76'. Cap 79 seals the open end of passageway 78. Temperature sensor 70 passes through first passageway 77 and extends into internal fluid conduit 44 of flexible hose 60. Temperature sensor connector 74 may be in data communication with a control system (not shown) for controlling the power applied to heating element 80 so as to maintain a selected fluid temperature.

Referring now to FIG. 1B, the details of pressure-sealed connection 30 for heater power input 82 are described below. It should be understood that the elements and configuration of pressure-sealed connection 30 for heater power return 84 may be identical to those of heater power input 82, as is illustrated in FIG. 1A.

Pressure housing 20 is provided with a bore 21 that is internally threaded at a first end thereof which is open to an external surface of pressure housing 20. An opposing second end of bore 21 connects to internal fluid conduit 44 within the body of pressure housing 20. A circumferential groove 120 is provided in the wall of bore 21 for O-ring seal 110. Bore 21 may have a first portion with a first internal diameter (i.d.) adjacent the opening of bore 21 to the exterior of pressure housing 20 and a second portion with a second i.d. smaller than the first i.d. with a first shoulder 23 between the first portion and the second portion. As shown in the detail of FIG. 1C, bore 21 may have a third portion adjacent the second portion that has a third i.d. that is less than the second i.d. thereby forming a second shoulder 124. As shown in FIG. 1C, shoulder 124 may be beveled.

Power feedthrough 100 is sized to fit within the second portion of bore 21 in sealing engagement with circumferential O-ring seal 110. Other seal types may be used. Power feedthrough 100 comprises cylindrical body 102 which, in certain embodiments, is formed of stainless steel. Cylindrical body 102 has a central axial bore having a first portion proximate the end of body 102 that is adjacent threaded retainer cap 116 in FIG. 1B, said first portion having a first smaller inside diameter (i.d.) and a second portion proximate the end of body 102 that is adjacent stop insert 122 in FIG. 1B, said second portion having a second larger i.d. that is greater than the first smaller i.d. thereby forming shell portion 104 of body 102.

Conductor pin 108 is held within the central axial bore of body 102 by insulator 106. In an embodiment, insulator 106 is a ceramic material. As illustrated in FIG. 1B, insulator 106 may fill the annular space between conductor pin 108 and the wall of the central axial bore in body 102 in the first portion of the bore and overlap a portion of body 102 around the central axial bore on both the exterior portion of body 102 and the internal shoulder of body 102 between the first portion and the second portion of the central axial bore. Conductor pin 108 may be formed of any suitable electrical conductor and may extend for a distance beyond the upper end (in FIG. 1B) of body 102 and for a distance into shell portion 104 sufficient to permit the connection of electrical leads. In yet other embodiments (not shown), body 102 may be formed of an insulating material and insulator 106 is not required.

Power feedthrough 100 may be retained in bore 21 between threaded retainer cap 116 and stop insert 122. In an embodiment, stop insert 122 is formed of an engineering plastic such as, for example, polytetrafluoroethylene (PTFE), polyetheretherketone (PEEK), nylon, or the like. As illustrated in FIG. 1B, stop insert 122 may fit partially into shell portion 104 of body 102 of power feedthrough 100. Stop insert 122 may have an interference fit with the inner surface of shell portion 104 of body 102 of power feedthrough 100 such that stop insert 122 and power feedthrough 100 may be inserted as an assembly into bore 21 with heating element 80 connected to conductor pin 108 by means of heating element connector 112. Heating element connector 112 may be provided with bleed hole 115 to facilitate connection to conductor pin 108 and with through hole 113 for connection to uninsulated portion 81 of heating element 80 by, for example, soldering. The annulus between heating element connector 112 and the interior surface of stop insert 122 may be filled with a filler 126. In an embodiment, filler 126 is an epoxy resin.

Stop insert 122 may be sized and configured to contact shoulder 124 within bore 21 and thereby limit its travel in bore 21 towards internal fluid conduit 44. It will be appreciated that shoulder 124 may be quite narrow (the difference in i.d. of bore 21 creating shoulder being about 0.001 inch in an embodiment) inasmuch as fluid pressure within fluid conduit 44 and the connecting portion of bore 21 tends to urge the assembly of stop insert 122 and power feedthrough 100 off of shoulder 124. In certain embodiments (particularly those wherein body 102 is formed of an insulating material), power feedthrough 100 and stop insert 122 may be combined as a single piece.

Threaded retainer cap 116 has central axial bore 118 into which a portion of conductor pin 108 projects as well as an end of heater power input 82 (or heater power return 84). In certain embodiments, threaded retainer cap 116 may be sized and configured to contact shoulder 23 within bore 21. In other embodiments, as illustrated in FIG. 1B, there may be a gap between the interior end of cap 116 and shoulder 23. It will be appreciated that cap 116 mechanically retains power feedthrough 100 in bore 21 while O-ring 110 provides the fluid-tight seal between the body of pressure housing 20 and power feedthrough 100. As such, the assembly of body 102 and stop insert 122 may slide within bore 21 while maintaining a fluid-tight seal so long as O-ring 110 is able to maintain sealing engagement with the exterior surface of body 102 of power feedthrough 100.

Power connector 114 may be used to connect the exterior end of conductor pin 108 to heater power input 82 (or heater power return 84, as the case may be). In an embodiment, power connector 114 is a crimp connector. An insulator (not shown) may be provided around the exterior of power connector 114. In an embodiment, such insulator comprises heat-shrink tubing.

The inlet of a substantially similar hose assembly 10 (or 12) comprising heated hose 60 may be attached to the outlet of an assembly comprising hose 60. It will be appreciated that any number of additional hose assemblies may be fluid-connected in serial to achieve a desired total hose length.

Certain embodiments of the present invention include temperature sensor 70 in pressure housing 20. A heated liquid passing through pressure housing 20 may be detected and measured by sensor 70. An accurate temperature may be measured with sensor 70 for a determination of the pressure required to dispense a heated liquid at a selected rate from apparatus 10 (or 12) and whether the heated liquid has reached a suitable temperature to react properly with another liquid reactant with which it is to be mixed.

The illustrated embodiment of heating element 80 shows power input end 82 protruding from pressure-sealed connection 30 of a first pressure housing 20, and power return end 84 protruding from pressure-sealed connection 30 of a second pressure housing 20. A power supply (not shown) connects to ends 82, 84. The power supply may be an AC or DC power supply. The circuit is completed to generate heat from electric resistance heating in element 80 within hose 60. A power return line may be run along the outside of hose 60 which may be the neutral line in an AC-powered system. In an embodiment, the return power line comprises an insulated, low-resistance conductor such as copper.

The present invention also includes the method of heating a liquid in a conduit using apparatus 10 or 12 of FIGS. 1A and 2 equipped with the heating means shown in FIG. 1A. Apparatus 10 (or 12) may be assembled and one or more additional hose segments may be added at outlet 26 so as to obtain a desired total hose length. Apparatus 10 (or 12) forms a pressure-resistant, sealed flow path. Then, a liquid in a conduit at an initial temperature may be pumped into inlet 22 of the first pressure housing 20. Following the flow path, the liquid may be pumped through hose 60 and heated within hose 60 (and subsequent hose segments) by heating element(s) 80. Heating element 80 may be connected to a power supply to generate heat within hose 60. The intimate contact with heating element(s) 80 increases the temperature of the liquid in a conduit so as to form a heated liquid at a desired temperature in pressure housing 20, after being pumped through hose 60. Upon exiting outlet 26, the heated liquid may be mixed with one or more liquids in other conduits for coating or foaming by, for example, a multi-component sprayer.

Embodiments of the method further include detecting the temperature of the heated liquid in pressure housing 20 with sensor 70. The data may be used to automatically adjust pumping rates, which affect the rate of heated liquid delivered for coating and foaming. In addition to (or in place of) temperature, viscosity or chemical reactivity could also be measured by sensor 70. This information may also be used to automatically adjust the power applied to heating element 80 so that the liquid in the conduit is in a desired state for mixing, coating, foaming, or the like.

The present invention provides an apparatus and method to heat a liquid in a conduit under pressure. Prior heat transfer means include heating the conduit in which the liquid is flowing from the outside of the conduit. The liquid in a conduit is heated from the outside in, so the heat transfer may not be very efficient or evenly distributed. Waste heat radiates outward from the wraps and layers, instead of moving inward to the liquid in the conduit. There is also waste heat from heating an entire metal module to get the correct amount of heat to the liquid in a conduit. In the present invention, the heating element maintains a liquid in a conduit at a desired temperature before mixing. The heating element is within a flow path of the liquid in a conduit for direct contact and heat transfer inside out, instead of outside in. Greater efficiency is achieved because there is less waste heat. The heat transfers outward into the liquid in a conduit, and radiating outward is no longer waste heat. Any loss of heat would result from the liquid in the conduit transferring heat to the conduit. This loss of heat may be balanced by compensating with increased heat from the heating element. The apparatus and method of the present invention efficiently provides highly controlled heat to better regulate the heated liquid in a conduit exiting the apparatus for coating and foaming in a multi-component sprayer system.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A heated hose assembly comprising:
    a flexible fluid conduit having an inlet end and an opposing outlet end;
    a first pressure housing connected to the inlet end of the flexible fluid conduit said first pressure housing comprising a fluid passageway extending from a first end of the housing to an opposing second end of the housing and a bore intersecting the fluid passageway and extending to a side of the housing;
    a second pressure housing connected to the outlet end of the flexible fluid conduit said second pressure housing comprising a fluid passageway extending from a first end of the housing to an opposing second end of the housing and a bore intersecting the fluid passageway and extending to a side of the housing;
    an electric heater within a flow channel of the flexible fluid conduit said heater having first and second electrical power contacts;
    a first power feedthrough in the intersecting bore of the first pressure housing in electrical connection to the first electrical power contact of the electric heater and comprising
        a generally cylindrical body having a central axial bore;
        a conductor pin within the central axial bore connected at a first end thereof to the first electrical power contact of the electric heater; and
    a seal in a wall of the intersecting bore of the first pressure housing in sealing engagement with an external surface of the generally cylindrical body of the first power feedthrough.

2. The heated hose assembly recited in claim 1 further comprising:
    a second power feedthrough in the intersecting bore of the second pressure housing in electrical connection to the second electrical power contact of the electric heater and comprising
        a generally cylindrical body having a central axial bore;
        a conductor pin within the central axial bore connected at a first end thereof to the second electrical power contact of the electric heater; and
    a seal in a wall of the intersecting bore of the second pressure housing in sealing engagement with an external surface of the generally cylindrical body of the second power feedthrough.

3. The heated hose assembly recited in claim 1 wherein the electric heater is an electric resistance heater.

4. The heated hose assembly recited in claim 3 wherein the electric heater comprises a nickel-chromium alloy electrical conductor.

5. The heated hose assembly recited in claim 3 wherein the electric heater comprises an electric resistance element having a polytetrafluoroethylene coating.

6. The heated hose assembly recited in claim 1 wherein the seal in a wall of the intersecting bore of the first pressure housing is in a circumferential groove in the wall of the intersecting bore of the first pressure housing.

7. The heated hose assembly recited in claim 6 wherein the seal is an O-ring seal.

8. The heated hose assembly recited in claim 1 wherein the conductor pin is in spaced-apart relation to an inner surface of the central axial bore of the power feedthrough thereby forming an annulus.

9. The heated hose assembly recited in claim 8 wherein the annulus is filled with an electrical insulator.

10. The heated hose assembly recited in claim 9 wherein the electrical insulator comprises a ceramic material.

11. The heated hose assembly recited in claim 1 wherein the central axial bore of the first power feedthrough has a first portion having a first inside diameter (i.d.) and a second portion adjacent the first portion and having a second i.d. that is greater than the first i.d.

12. The heated hose assembly recited in claim 11 wherein the conductor pin extends into the second portion of the central axial bore.

13. The heated hose assembly recited in claim 12 further comprising a heating element connector in electrical contact with the electric heater at a first end thereof and in electrical contact with the conductor pin at a second opposing end thereof.

14. The heated hose assembly recited in claim 13 further comprising a generally tubular stop insert at least partially within the second portion of the central axial bore of the first power feedthrough.

15. The heated hose assembly recited in claim 14 wherein the tubular stop insert is sized to create an annulus between an inner wall of the tubular stop insert and the heating element connector and the annulus is filled with an epoxy filler.

16. The heated hose assembly recited in claim 14 wherein the intersecting bore in the first pressure housing has a first section having a first inside diameter (i.d.), a second section having a second i.d. that is less than the first i.d. thereby forming a first shoulder between the first section and the second section, and a third section having a third i.d. that is less than the second i.d. thereby forming a second shoulder between the second section and the third section and the stop insert is sized and configured to rest on the second shoulder.

17. The heated hose assembly recited in claim 16 wherein the first section of the intersecting bore in the first pressure housing is internally threaded and the assembly further comprises a retainer cap in threaded engagement with the first section of the intersecting bore said retainer cap sized and configured to retain the first power feedthrough in the second section of the intersecting bore in the first pressure housing.

18. The heated hose assembly recited in claim 1 further comprising:
 a sensor adapter block having a first internal passageway in fluid communication with the first pressure housing; and
 a pressure sensor in fluid communication with the first internal passageway.

19. The heated hose assembly recited in claim 1 further comprising:
 a sensor adapter block having a first internal passageway in fluid communication with the second pressure housing; and
 a temperature sensor within the first internal passageway.

20. The heated hose assembly recited in claim 19 further comprising:
 a power controller having an output connected to the electric heater and an input in data communication with the temperature sensor
wherein the power controller adjusts power supplied to the electric heater in response to data from the temperature sensor.

* * * * *